April 23, 1946.  L. D. ROUNDS  2,398,965

LOCK NUT AND BOLT

Filed Nov. 22, 1944

INVENTOR.
*Louis D. Rounds*
BY
*Victor J. Evans & Co.*
ATTORNEYS

Patented Apr. 23, 1946

2,398,965

UNITED STATES PATENT OFFICE 2,398,965

LOCK NUT AND BOLT

Louis D. Rounds, Toledo, Ohio

Application November 22, 1944, Serial No. 564,577

2 Claims. (Cl. 151—13)

The invention relates to a nut lock, and more particularly to a combined washer and nut lock.

The primary object of the invention is the provision of a device of this character, wherein in the use thereof on a nut carrying bolt, the said nut can be adjusted for working the same tight, yet such nut cannot work loose, or will the bolt become loose in the work, resultant from the slackening of such nut.

Another object of the invention is the provision of a device of this character, wherein it affords a washer for the nut and is ratchet acting in one direction, to avoid the working loose of the nut on a bolt, the device being novel in construction and unique in the working thereof.

A further object of the invention is the provision of a device of this character, wherein the same is a one piece construction, and is positive in the working thereof when in association with a nut and bolt, such device being held in a fixed position on the bolt so as to avoid a loss in the grip thereof on the bolt or the nut when in applied position.

A still further object of the invention is the provision of a device of this character, which is simple in construction, thoroughly reliable and efficient in operation, strong, durable, readily and easily applied, automatic in the working thereof, enabling the easy tightening of the nut on the bolt, and inexpensive to manufacture and install.

With these and other objects in view, the invention consists in the features of construction, combination and arrangement of parts as will be hereinafter more fully described, illustrated in the accompanying drawing, which shows the preferred embodiment of the invention and pointed out in the claims hereunto appended.

In the accompanying drawing.

Similar reference characters indicate corresponding parts throughout the several views in the drawing.

Figure 1:
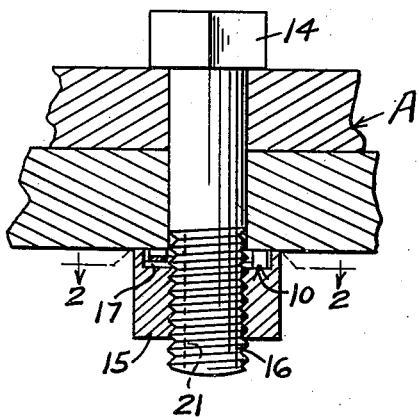
Figure 1 is a fragmentary sectional view through a piece of work showing partly in elevation and partly in section the device constructed in accordance with the invention applied.
Figure 3:
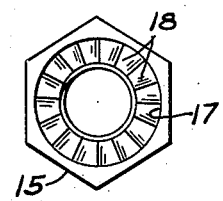
Figure 3 is an inner face view of the nut for the bolt.
Figure 2:
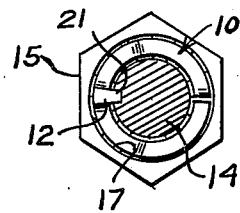
Figure 2 is a sectional view taken on the line 2—2 of Figure 1 looking in the direction of the arrows.
Figure 4:
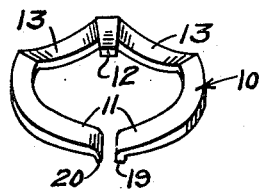
Figure 4 is a perspective view of the device detached.

Referring to the drawing in detail, A designates generally sectional portions of a piece of work to be held together by the device constituting the present invention as hereinafter set forth in detail.

The device comprises a split ring-like washer member 10, which is tapered at the ends 11 toward the split therein and these ends are slightly distorted in the same direction approaching the split in the member, while directly opposite the said split is a key nib 12 projected inwardly of the member 10.

At opposite sides of the nib 12 are concave-convexed runs or areas 13 which merge into the nib 12 and also into the ends 11, and such runs or areas 13 effect depressible cams in the working of the device when applied to a bolt carrying a nut.

The bolt 14 carrying the nut 15 is headed and provided with a threaded shank or stem 16 for the nut threaded thereon.

The nut at its inner face is formed with a circular countersunk seat 17 for the member 10, while this seat at the floor thereof concentric to the bolt 14 is provided with ratchet teeth 18 with which is engageable a latching jaw 19 formed at one end 11, while at the other end is a ratchet acting pawl terminal 20 of such member 10, these terminals co-acting with the teeth 18 for ratchet action, permitting the nut 15 to be worked home on the bolt, yet preventing such nut from working loose thereon, or the said bolt being freed in the work A.

The nib 12 slidably engages in a groove 21 provided longitudinally in the shank or stem 16 of the bolt 14 to prevent the accidental turning of the member 10 when encircling the said bolt. The member 10 is inherently resilient and effects a positive nut lock, as well as a washer for the said nut when engaged on the bolt.

What is claimed is:

1. A washer and lock for a bolt carrying a nut, comprising a resilient ring-like split member having ends distorted in the same direction and tapered toward the split therein, concave-convexed cam areas opposite the split and spaced from each other, ratchet teeth formed on the nut at its inner face and confronted by the member, ratchet terminals on said ends, and means for slidably holding the member engaged with the bolt.

2. A washer and lock for a bolt carrying a nut, comprising a resilient ring-like split member having ends distorted in the same direction and tapered toward the split therein, concave-convexed cam areas opposite the split and spaced from each other, ratchet teeth formed on the nut at its inner face and confronted by the member, ratchet terminals on said ends, and means for slidably holding the member engaged with the bolt, the said teeth being countersunk in the nut.

LOUIS D. ROUNDS.